United States Patent [19]

Shibahata et al.

[11] Patent Number: 4,534,435
[45] Date of Patent: Aug. 13, 1985

[54] COMPLIANCE STEER CONTROL ARRANGEMENT FOR AUTOMOTIVE VEHICLE SUSPENSION

[75] Inventors: Yasuji Shibahata; Namio Irie, both of Yokohama; Kazuo Ikawa, Tokorozawa; Yohsuke Akatsu, Yokohama, all of Japan

[73] Assignee: Nissan Motor Co., Ltd., Yokohama, Japan

[21] Appl. No.: 501,091

[22] Filed: Jun. 6, 1983

[30] Foreign Application Priority Data

Jun. 7, 1982 [JP] Japan ................... 57-97366

[51] Int. Cl.³ ............................ B62D 5/06; B62D 9/00
[52] U.S. Cl. ..................................... 180/140; 180/132; 180/135; 280/112 A; 280/671
[58] Field of Search ................... 280/112 A, 671, 672; 180/135, 140, 132; 267/35

[56] References Cited

U.S. PATENT DOCUMENTS

| 2,757,938 | 8/1956 | Crowder | 280/112 A |
| 2,804,311 | 8/1957 | Pobanz | 280/112 A |
| 2,893,751 | 7/1959 | Hagler | 280/112 A |
| 2,993,263 | 8/1961 | Mueller et al. | 29/157.3 V |
| 3,207,254 | 9/1965 | D'Espinassy de Venel | 180/70.1 |
| 4,168,075 | 9/1979 | Matchinsky | 280/6 H |
| 4,440,254 | 4/1984 | Shibahata et al. | 180/140 |

FOREIGN PATENT DOCUMENTS

| 54775 | 6/1982 | European Pat. Off. |
| 1655653 | of 0000 | Fed. Rep. of Germany |
| 1630134 | of 0000 | Fed. Rep. of Germany |
| 2553494 | of 0000 | Fed. Rep. of Germany |
| 2752908 | of 0000 | Fed. Rep. of Germany |
| 3139792 | of 0000 | Fed. Rep. of Germany |
| 937810 | 12/1955 | Fed. Rep. of Germany |
| 1630639 | 6/1971 | Fed. Rep. of Germany |
| 55-147968 | 10/1980 | Japan |
| 368063 | 4/1973 | Switzerland |
| 2083422 | 8/1981 | United Kingdom | 180/140 |

Primary Examiner—Richard A. Bertsch
Attorney, Agent, or Firm—Schwartz, Jeffery, Schwaab, Mack, Blumenthal & Evans

[57] ABSTRACT

A hydraulic or pneumatic servo arrangement which is controlled in response to the rotation of the steering wheel is connected to member of a rear suspension in a manner to apply a bias thereto which distorts an elastomeric insulator or insulators forming part of suspension so as to steer the wheel or wheels associated with the member in the same direction as the front wheels are steered.

6 Claims, 23 Drawing Figures

COMPLIANCE STEER CONTROL ARRANGEMENT FOR AUTOMOTIVE VEHICLE SUSPENSION

BACKGROUND OF THE INVENTION

1. Field of the Invention

The present invention relates generally to an automotive suspension and more specifically to a suspension in which a member (or members) thereof which supports a road wheel is subject to a bias which distorts an elastomeric insulator or insulators in a manner to "steer" the wheels.

2. Background of the Invention

In a previously proposed arrangement such as shown in FIG. 1 of the drawings, the rear wheels 1 of a vehicle are supported on a live or rigid axle 2 via knuckle rods 3 which are interconnected by a tie rod 4. A servo cylinder 5 operated by either compressed air or hydraulic fluid is connected to one of the knuckle rods 3 in a manner to turn the wheels 1 in a manner to steer same in response to the lateral acceleration of the vehicle and compensate for the inevitable compliance steer phenomenon permitted by the elastomeric nature of the bushes and elements included in the suspension to damp vibration.

However, this arrangement has suffered from the drawbacks that each of the rear wheels must be pivotally mounted on a king pin (or the like) in a manner similar to the front wheels, which markedly increases the cost and weight of the vehicle and further imposes notable design limitations on the rear suspension.

A detailed description of the above described arrangement can be found in Japanese Utility Model Patent Application Pre Publication No. Sho 55-147968.

SUMMARY OF THE INVENTION

It is an object of the present invention to provide a compliance steer control arrangement for the suspension of an automotive vehicle which applies a bias to an elastomeric insulator (or insulators) forming part of the suspension in a manner to distort the insulator so that the wheel with which it is associated, is steered in the same direction as the vehicle is being steered via manipulation of the vehicle steering wheel (for example).

In brief the invention features a hydraulic or pneumatic servo arrangement which is controlled in response to the rotation of the steering wheel and which is connected to a member of at least one of the front and rear suspensions in a manner to apply a bias thereto. This bias distorts an elastomeric insulator or insulators forming part of the suspension so as to steer the wheel or wheels associated with the member in the same direction as the front wheels are steered via rotation of the steering wheel.

More specifically, the invention takes the form of a suspension arrangement for a vehicle having a chassis and a steering wheel, an elastomeric member, a first member operatively connected to the chassis through the elastomeric member, a road wheel operatively connected with the first member, and an arrangement responsive to the vehicle being steered which is operatively connected to the first member for applying a bias to the elastomeric member in a manner to change the orientation of the road wheel with respect to the longitudinal axis of the chassis and thus steer the road wheel in the same direction as the vehicle is being steered.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
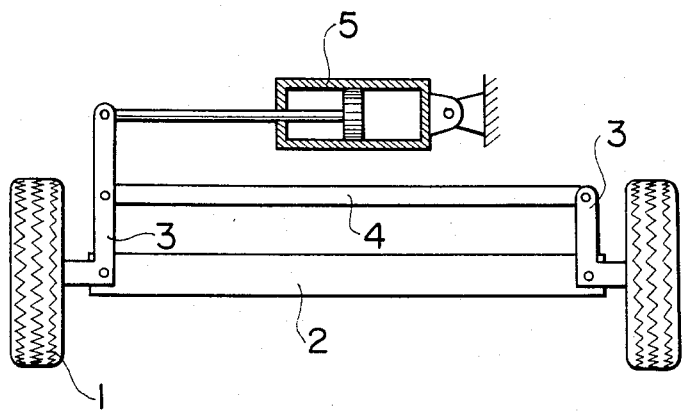
FIG. 1 is a schematic plan view (partly in section) of the prior art arrangement discussed in the opening paragraphs of the present disclosure.
Figure 3:
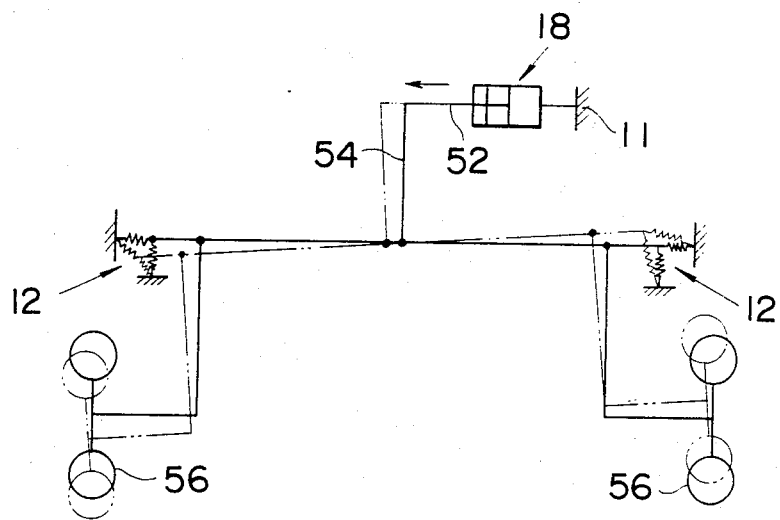
FIG. 3 is a schematic representation of the arrangement shown in FIG. 2, which illustrates the distortion of the elastomeric insulators forming part of the suspension and the resulting "steering" of the road wheels.
Figure 2:
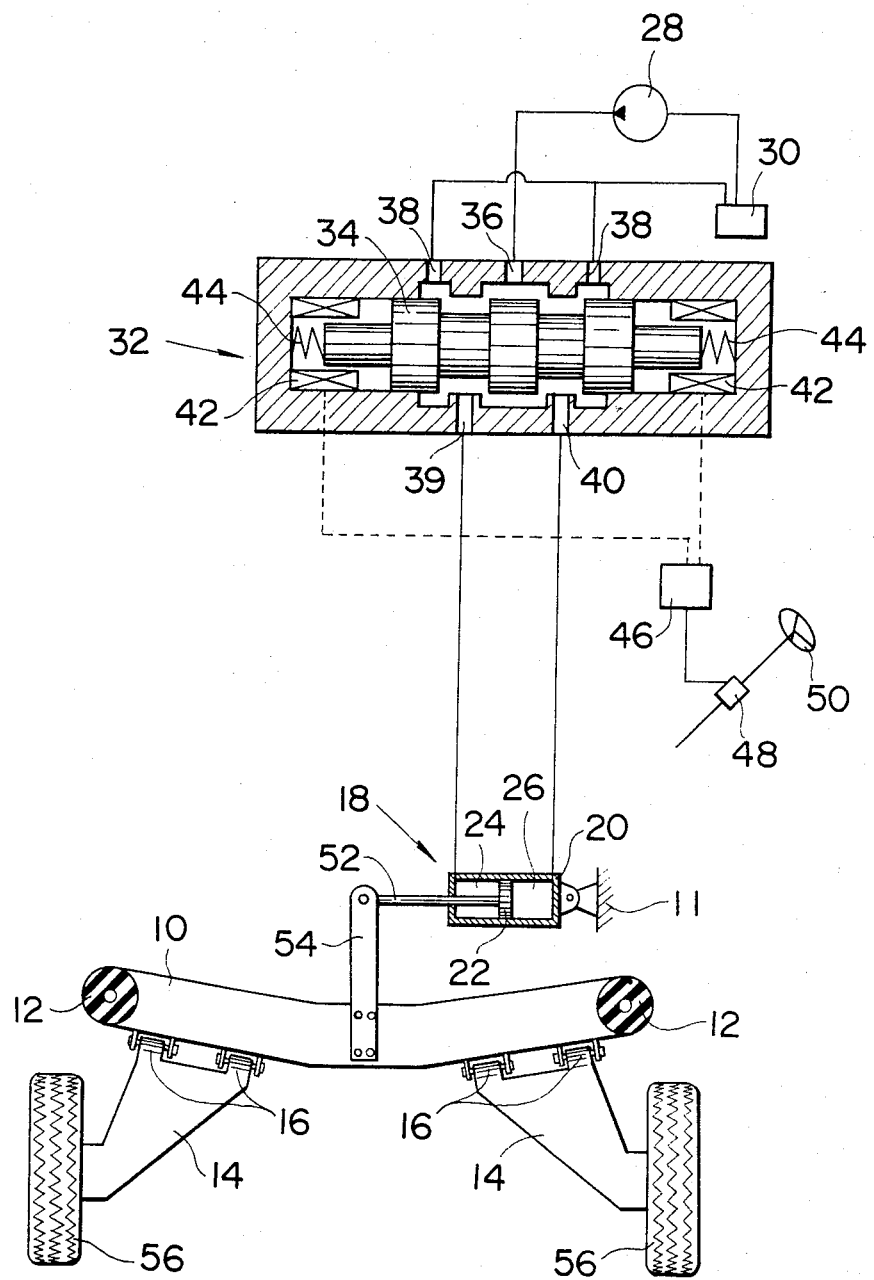
FIG. 2 is a schematic plan view of a first embodiment of the present invention.

Turning now to FIGS. 2 and 3 of the drawings a first embodiment of the present invention is shown. In this arrangement a suspension cross member 10 defining a first member is mounted on a vehicle chassis 11 through elastomeric insulators 12. Suspension arms 14 (in this case trailing arms) defining second member are pivotally mounted to the cross member 10 through pivots or "hinges" 16 in a well known manner. Operatively connected with the cross member 10 is a hydraulic servo device 18. This device, as shown, includes a cylinder 20 in which a piston 22 is reciprocatively disposed to define first and second variable volume chambers 24, 26. These chambers are fluidly communicated with a source of hydraulic fluid under pressure including a pump 28 and a fluid reservoir 30 via a solenoid control valve 32. The valve 32 includes a spool 34 which controls the communication between a line pressure inlet port 36, drain port 38 and discharge ports 39, 40. The movement of the spool 34 and consequently the modulation of the pressure fed to the variable volume chambers 24, 26 via ports 39, 40 is controlled by solenoids 42, and springs 44. The solenoids 42 are operatively connected to a control circuit 46 which outputs suitable energization signals the duty cycles (by way of example) of which are varied in response to the output of a steering sensor 48. This sensor 48 may output a signal indicative of the amount of turning of the front wheels, the rate at which they are turned or the like, depending on the type of vehicle to which the present invention is being applied and/or the desired control characteristics to be produced by the servo device.

The operation of this arrangement is such that upon rotation of the steering wheel 50 the vehicle tends to be steered in a given direction. Simultaneously, this steering is sensed by the steering sensor 48 and outputs a signal indicative of same to the control circuit 46. The solenoids 42 of the valve 32 are subsequently energized to increase the pressure in one of the variable volume chambers 24, 26 and decrease the pressure in the other. This applies a bias to the cross member 10 through the piston rod 52 and extension member 54 fixedly attached to the cross member 10. This bias, as shown in FIG. 3, distorts the elastomeric insulators or bushes 12 and "steers" the rear road wheels 56. The amount of so called "steering" of the rear wheels 56 can be controlled by selecting the diameter of the piston 22, the pressures fed to the chambers 26, 24, the length of the extension member 54 to which the piston rod 52 is pivotally connected etc., to compensate for the compliance steering of the rear wheels 56 which inevitably occurs during cornering (or the like), or actually steer the wheels positively in the same direction as the front (steerable) wheels (not shown) as desired.

Figure 4:
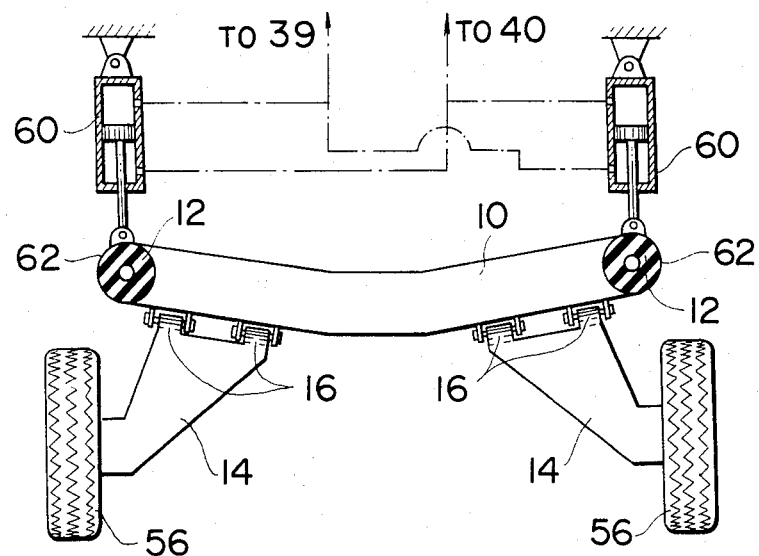
FIG. 4 is a plan view of a second embodiment of the present invention.
Figure 5:
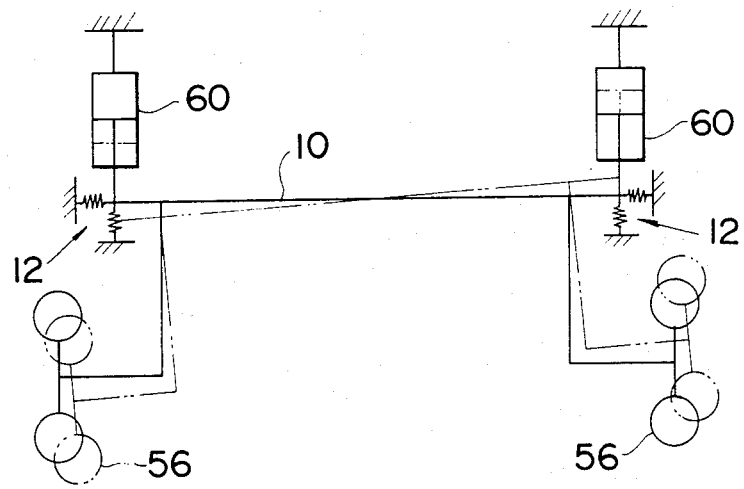
FIG. 5 is a schematic representation of the arrangement shown in FIG. 4 showing the distortion of the elastomeric insulators of the suspension and the steering of the road wheels induced thereby.

FIGS. 4 and 5 show a second embodiment of the present invention. In this arrangement the single servo device of the first embodiment is replaced with two cylinders 60 which are pivotally connected to the housings or retainers 62 in which the elastomeric insulators 12 are disposed. The operation of this arrangement is similar to that of the first embodiment and produces the effect illustrated in FIG. 5.

Figure 6:
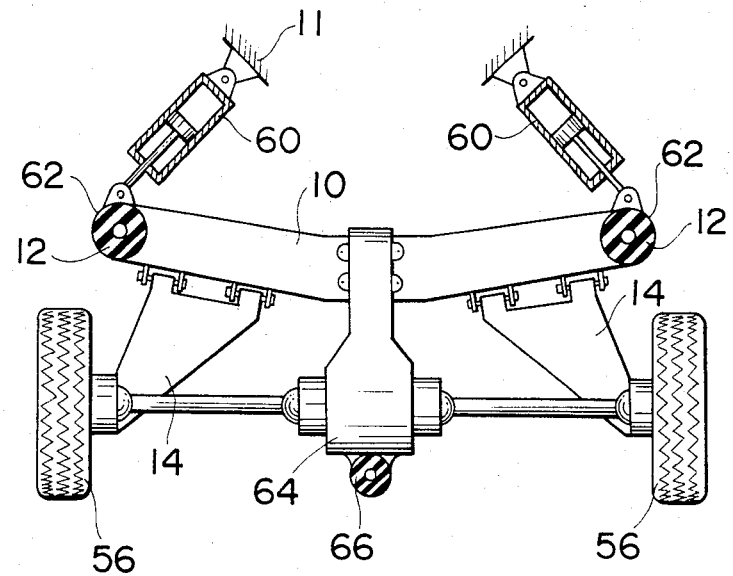
FIGS. 6 and 7 are views similar to those of FIGS. 4 and 5 but showing a third embodiment of the present invention.
Figure 7:
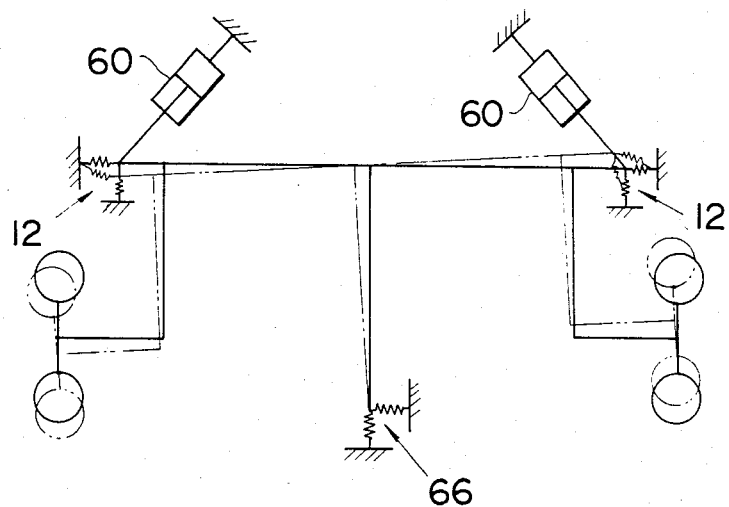

FIGS. 6 and 7 show a third embodiment of the present invention. This arrangement is essentially the same as that illustrated in FIGS. 4 and 5 with the exception that the cylinders 60 are connected to the chassis 11 at locations inboard of the locations of the cross member 10 of the suspension and the differential gear 64 of the vehicle (in this case a front or mid engine—rear wheel drive type) is connected to the vehicle chassis 11 through an insulator 66. The angling of the cylinders 60 facilitates the rotation of the suspension arrangement about a center defined by the insulator 66, as will be appreciated from FIG. 7.

Figure 8:
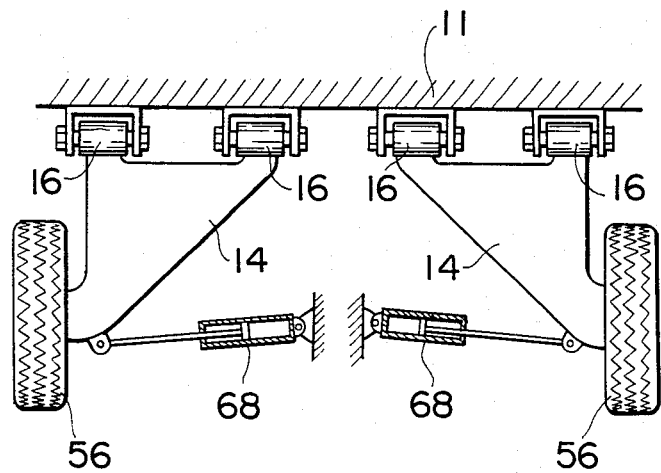
FIGS. 8 and 9 are schematic views of a fourth embodiment of the present invention.
Figure 9:
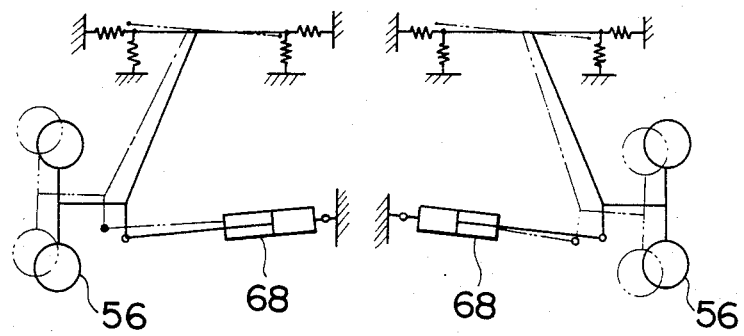

FIGS. 8 and 9 show a fourth embodiment of the present invention. In this arrangement suspension trailing arms 14 define first members which are connected to the chassis through pivots or hinges 16 and by extensible struts 68. FIG. 9 shows the effect of the extension and contraction of the struts 68. As shown, the elasomeric bushes (no numeral) defining parts of the pivots 16 are distorted in such a manner that the road wheels are "steered".

Figure 10:
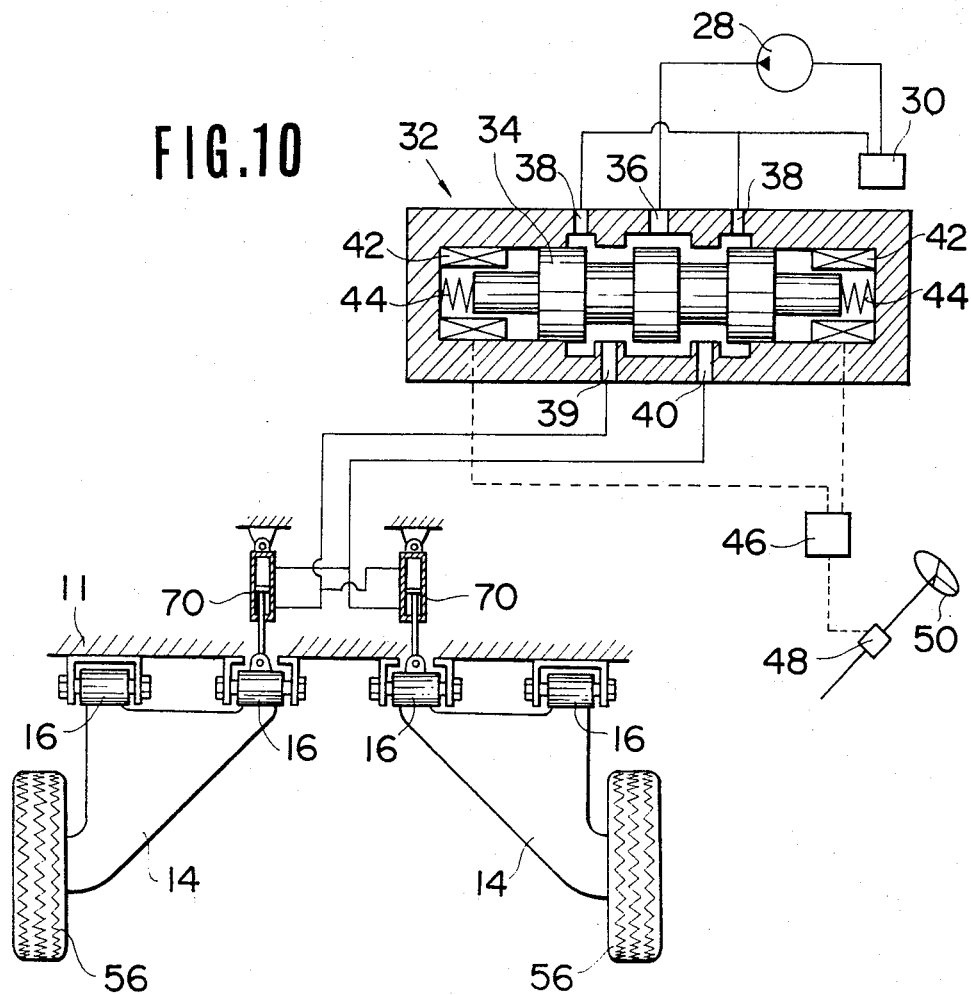
FIGS. 10 and 11 are schematic views of a fifth embodiment of the present invention.
Figure 11:
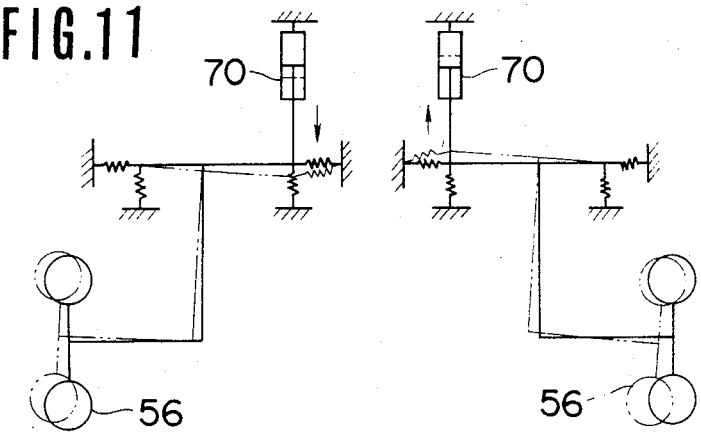

FIGS. 10 and 11 show a fifth embodiment of the present invention. In this arrangement two extensible struts 70 are pivotally connected to the trailing arms 14 at locations immediately adjacent the inboard pivots 16. With this arrangement, the elastomeric bushes forming part of the inboard pivots 16 are predominently distorted by the respective extension and contraction of the struts 70.

Figure 12:
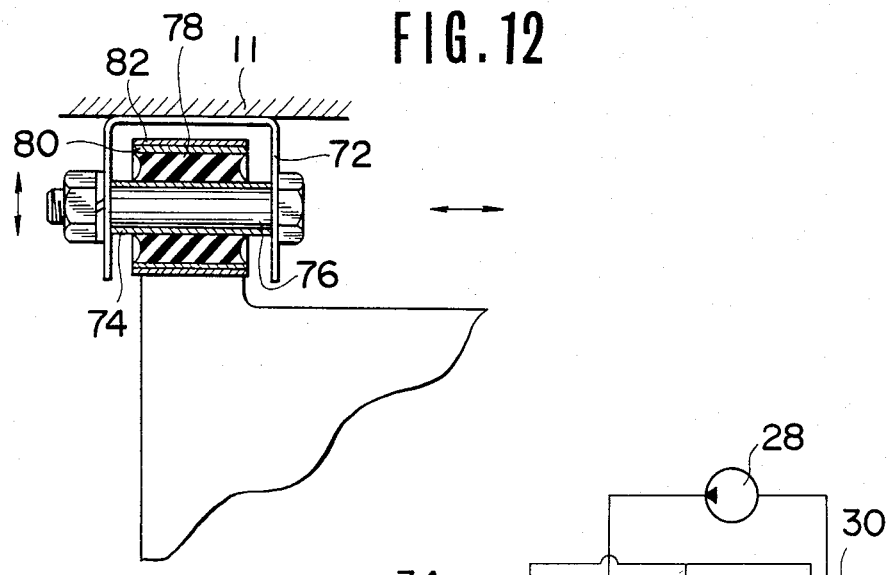
FIG. 12 is a sectional view of an insulator which forms part of the suspension systems to which the present invention is applied.

FIG. 12 shows in section, a typical pivot arrangement via which the pivotal members of the suspensions (e.g. trailing arms) described both hereinbefore and hereinafter, are pivotally attached to relatively stationary members (e.g. cross members) or to the chassis 11 directly. As shown, this arrangement includes a bracket 72 fixedly connected to the chassis 11 (for example), a rotatable sleeve 74 through which a securing bolt 76 is disposed and on which an elastomeric bush 78 is vulcanized or otherwise fixedly connected. The bush 78 is retained within an annular member 80 which is press fitted or otherwise retained within an annular member 82 integral with the suspension arm or link. As will be appreciated this arrangement is such as to exhibit a relatively high rigidity in the direction normal to the axis of rotation of the sleeve 74 and a rigidity in the direction coincident with the axis of rotation which is lower than that in the former mentioned radial direction.

Figure 13:
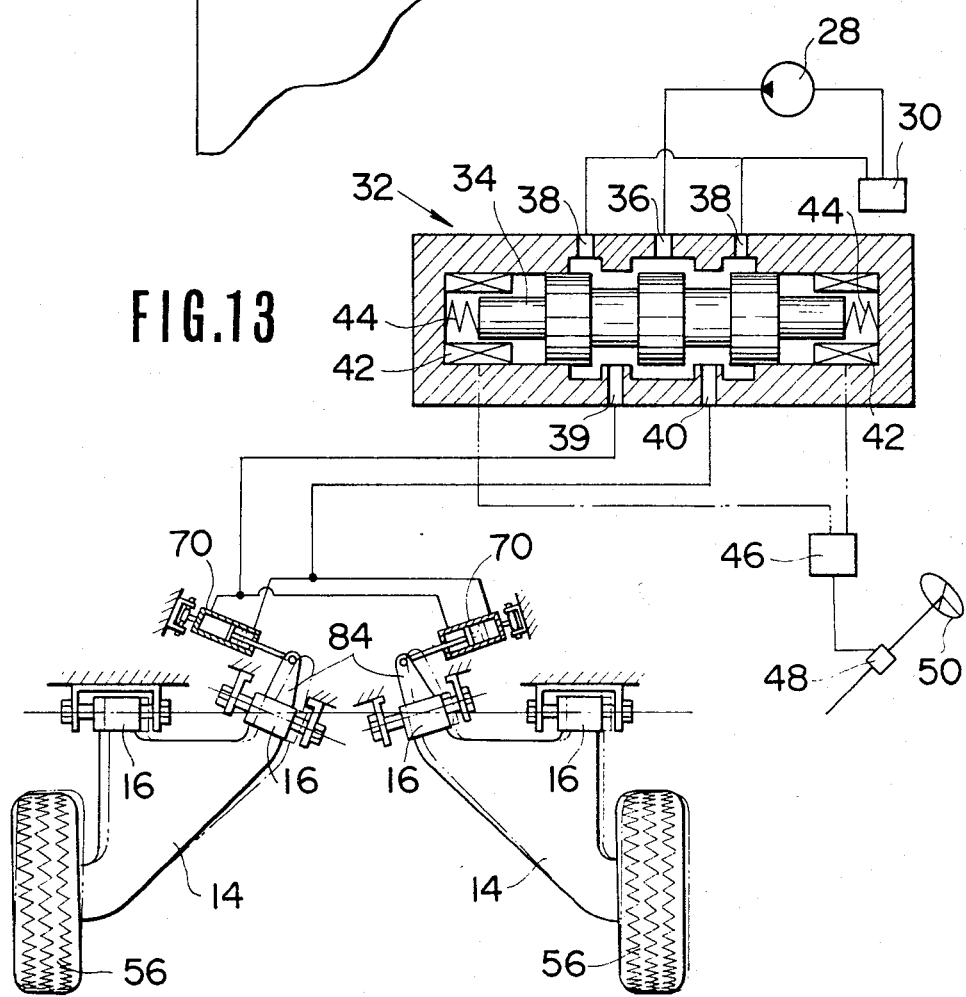
FIG. 13 is a schematic plan view of a sixth embodiment of the present invention.

FIG. 13 shows a sixth embodiment of the present invention. In this arrangement, which is similar to the arrangement shown in FIGS. 10 and 11, the extensible struts 70 are connected to extensions 84 which extend from the forward inboard edges of the trailing arms 14. The struts 70 in this arrangement are arranged essentially parallel with the axis of rotation of the inboard pivots 14 so as to apply a bias to the trailing arms in a manner which acts on the elastomeric bushes 78 in the direction of least resistance. In this arrangement the axes of rotation of the inboard and outboard pivots intersect at a location essentially in the center of the inboard pivots (in the rest or home positions thereof). This arrangement allows for the "steering" of the rear wheels with a reduced amount of force. That is to say, as the force which is applied to the elastomeric bushes acts in the direction of least resistance of the elastomeric bushes of the pivots, the maximum amount of displacement for a given amount of force may be obtained. Accordingly, the size and weight of the extensible struts 70 pump 28 etc., may be reduced permiting savings in both space and overall vehicle weight.

Figure 14:
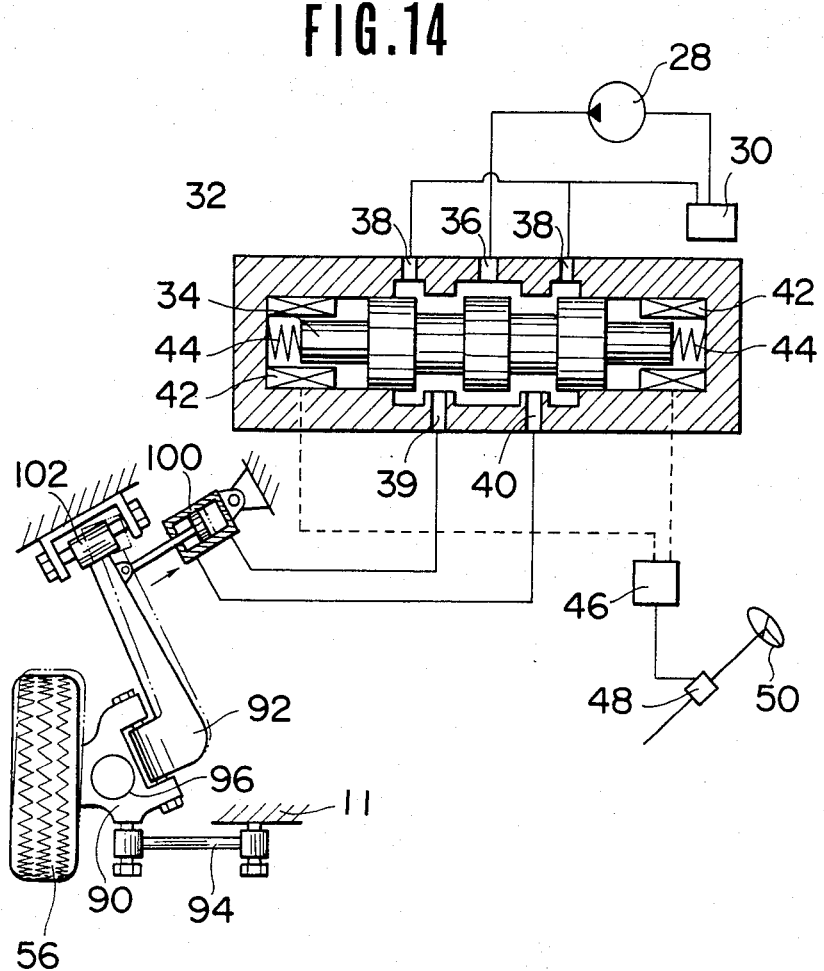
FIGS. 14 and 15 are views showing a seventh embodiment of the present invention.
Figure 15:
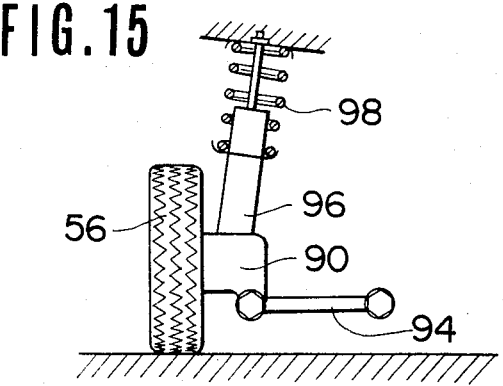

FIG. 14 shows a seventh embodiment of the present invention wherein a road wheel 56 is mounted on a wheel support member 90 which is operatively connected with the vehicle chassis 11 through a trailing link 92, a lateral link 94, a suspension strut 96 including a coil spring 98, and an extensible strut 100. In this arrangement the extensible strut 100 is connected between the chassis 11 and the trailing link 92 so as to be essentially parallel to the axis of rotation of the pivot 102 located at the forward end of the trailing link 92 and relatively close to the forward end so as to amplify the steering effect of the extensible strut 100 on the road wheel 56.

Figure 16:
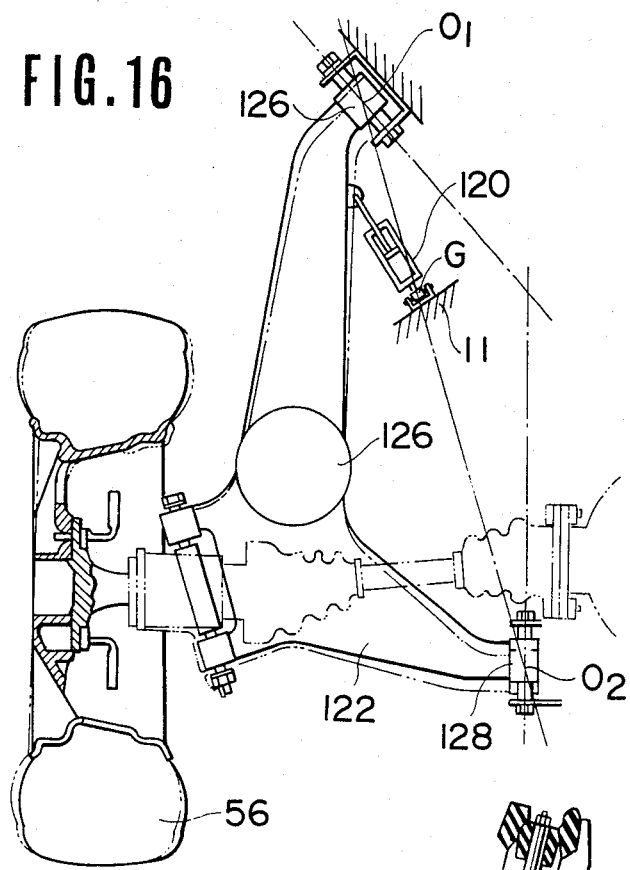
FIGS. 16 and 17 are respective plan and elevational views of an eighth embodiment of the present invention.
Figure 17:
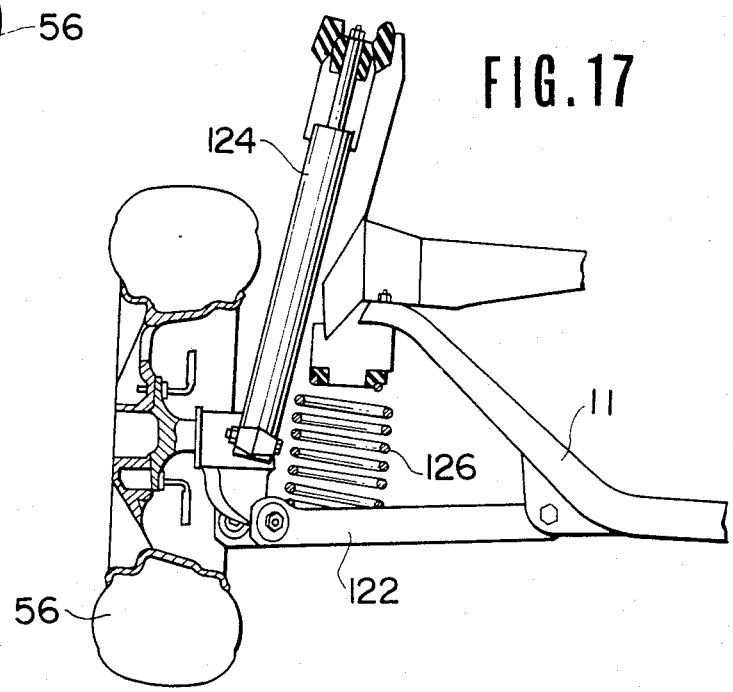

FIGS. 16 and 17 show an eighth embodiment of the present invention. In this arrangement an extensible strut 120 is interconnected between the vehicle chassis 11 and the forward end of the suspension arm 122 of a strut type suspension. In this embodiment the suspension strut 124 (shock absorber) and the coil spring 126 are independently interposed between the suspension arm 122 and the chassis 11. As shown, the extensible strut 120 is connected to the vehicle chassis 11 at a location "G" which lies on a line interconnecting the centers $O_1$, $O_2$ of the forward and rear pivots 126, 128 of the suspension arm 122 and thus, in this instance, is not quite parallel with the axis of rotation of the forward pivot 126. This minimizes the amount of extension and contraction which the strut 120 undergoes as a result of pivoting movement of the suspension arm 122 while still applying a bias on the elastomeric bush (not shown) of the forward pivot 126 in a manner to derive almost the maximum amount of distortion thereof for a given amount of extension/contraction of the strut. In this arrangement the axes of the pivots 126 and 128 intersect as shown in FIG. 16.

Figure 18:
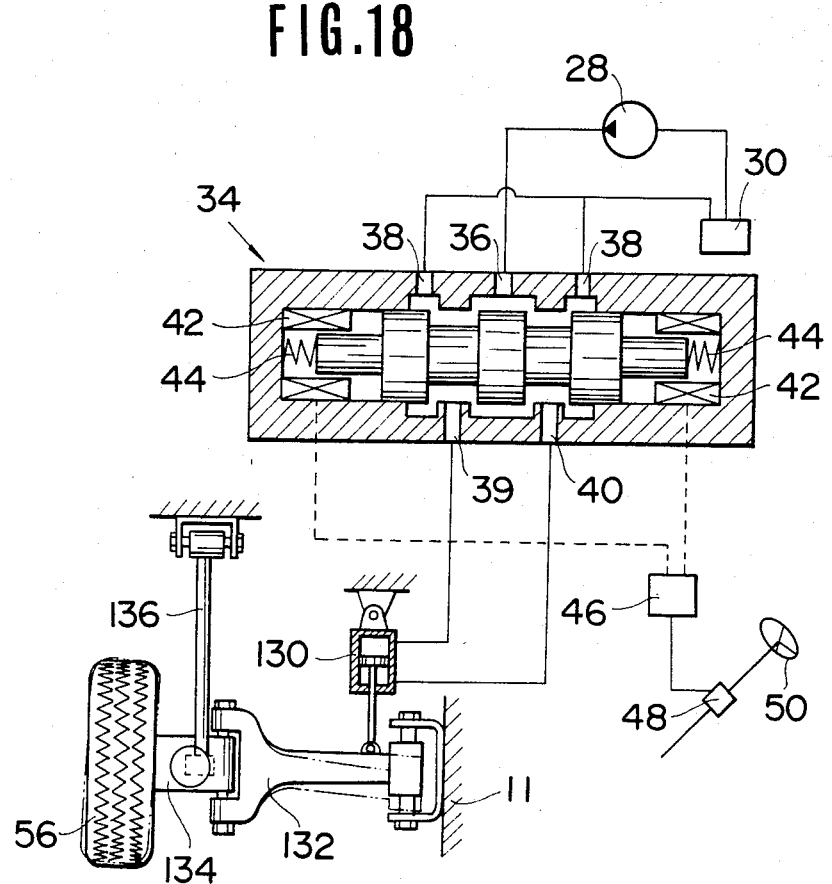
FIGS. 18 and 19 are views showing a ninth embodiment of the present invention.
Figure 19:
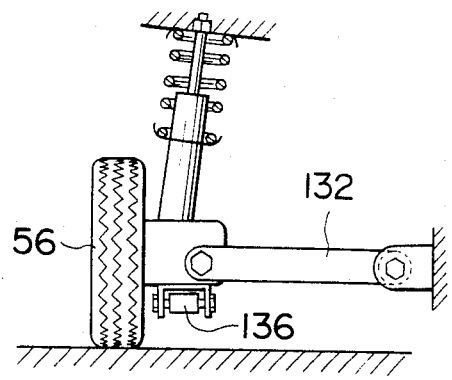

FIGS. 18 and 19 show a ninth embodiment of the present invention. In this arrangement an extensible strut 130 is interconnected between a transverse link 132 which extends laterally outwardly from the vehicle chassis 11 to the wheel support member 134. A trailing link 136 extends rearwardly from the chassis 11 to the wheel support member 134. In this arrangement, the extensible strut 130 is arranged essentially parallel with and close to the axis of rotation of the pivot located on the inboard end of the traverse link 132.

Figure 20:
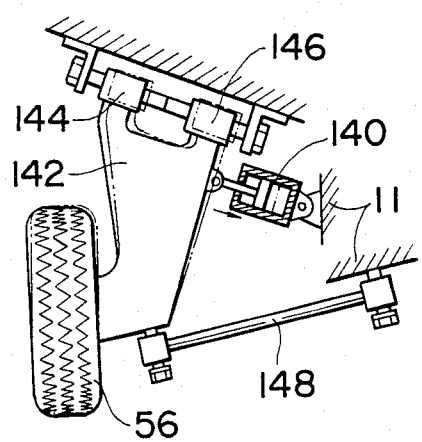
FIGS. 20 and 21 are respective plan and elevational views of a tenth embodiment of the present invention.
Figure 21:
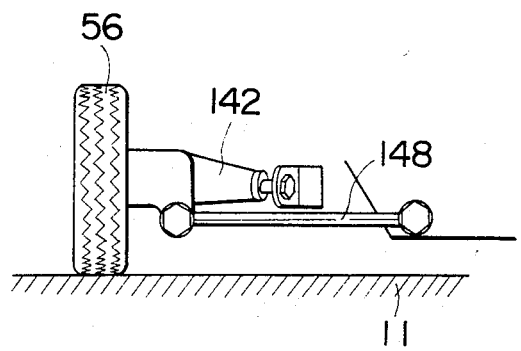

FIGS. 20 and 21 show a tenth embodiment of the present invention. This arrangement features an extensible strut 140 which extends between the vehicle chassis 11 and a trailing arm 142. In this case the trailing arm 142 is pivotally connected at the forward end thereof to the chassis through pivots 144, 146 and at the trailing end thereof via a single lateral link 148. With this arrangement, both of the elastomeric bushings of the pivots 144, 146 are distorted by the extension and contraction of the extensible strut 140 which applies a force to the trailing arm 142 in a direction essentially parallel with the coincident axes of rotation of the pivots.

Figure 22:
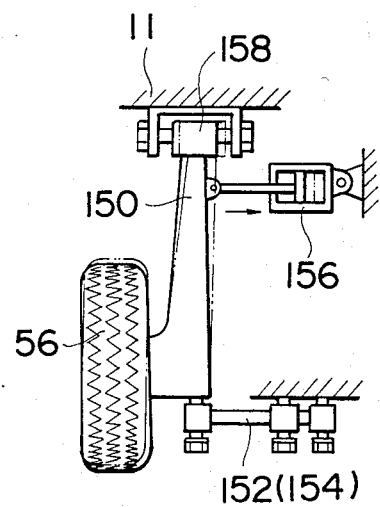
FIGS. 22 and 23 are respective plan and elevational views of an eleventh embodiment of the present invention.
Figure 23:
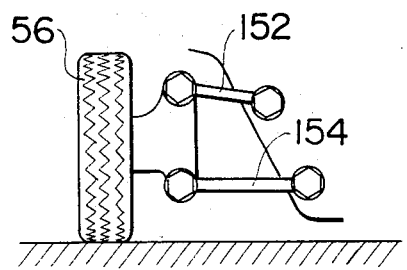

FIGS. 22 and 23 show an eleventh embodiment of the present invention wherein the traling arm 150 of a trailing arm type suspension arrangement is operatively connected with the chassis 11 through upper and lower lateral links 152, 154. The trailing arm 150 is interconnected at a location near the forward end thereof with the chassis 11 via an extensible strut 156. In this arrangement the extensible strut 156 applies force to the trailing arm 150 in a direction essentially parallel with the axis of rotation of the pivot 158 located at the forward end of said trailing arm.

What is claimed is:

1. In a suspension arrangement for a vehicle having a chassis and a steering wheel,
    an elastomeric member;
    a first member operatively connected to said chassis through said elastomeric member;
    a road wheel operatively connected with said first member; and
    an arrangement responsive to said vehicle being steered which is operatively connected to said first member for applying a bias to said elastomeric member in a manner to change the orientation of said road wheel with respect to the longitudinal axis of said chassis and steer the road wheel in the same direction as the vehicle is being steered.

2. A suspension system as claimed in claim 1, wherein said device includes:
    an extensible strut interconnecting said chassis and said first member;
    a steering sensor operatively connected with said steering wheel for outputting a signal indicative of the vehicle being steered;
    a source of fluid under pressure;
    a valve responsive to the output of said steering sensor and operatively connected with said extensible strut for supplying fluid under pressure thereto in response to the output of said steering sensor.

3. A suspension system as claimed in claim 1, wherein said first member is connected to said chassis through said elastomeric member and said road wheel is operatively connected to said first member through a second member pivotally mounted on said first member.

4. In a suspension for a vehicle having a chassis and a steering wheel,
    an elastomeric member;
    a first member operatively connected to said chassis through said elastomeric member;
    a road wheel operatively connected with said first member; and
    an arrangement responsive to said vehicle being steered which is operatively connected to said first member for applying a bias to said elastomeric member in a manner to change the orientation of said road wheel with respect to the longitudinal axis of said chassis and steer the road wheel in the same direction as the vehicle is being steered, wherein said first member is connected to said chassis through a first pivot having a first axis of rotation, and wherein said elastomeric member forms part of said first pivot.

5. A suspension as claimed in claim 4, wherein said elastomeric member is less rigid in the direction of said axis of rotation of said pivot than in a direction normal thereto, and wherein said arrangement responsive to the steering of said vehicle is arranged to apply a bias to said first member which distorts said elastomeric member in said direction of said axis of rotation.

6. A suspension arrangement as claimed in claim 4, further comprising a second pivot device interconnecting said first member with said chassis, said second pivot device being arranged so that the axis of rotation thereof intersects said first axis of rotation of said first pivot device.

* * * * *